US011378551B2

(12) United States Patent
Thomson et al.

(10) Patent No.: US 11,378,551 B2
(45) Date of Patent: Jul. 5, 2022

(54) INSPECTION DEVICES WITH LASER EMITTERS AND OPTICAL MICROPHONES, AND RELATED SYSTEMS AND METHODS

(71) Applicants: Northrop Grumman Systems Corporation, Falls Church, VA (US); XARION Laser Acoustics GmbH, Vienna (AT)

(72) Inventors: Clint D. Thomson, Smithfield, UT (US); Igor V. Ivakhnenko, Bountiful, UT (US); Lukas Balthasar Fischer, Vienna (AT); Wolfgang Rohringer, Vienna (AT); Fabian Luecking, Vienna (AT)

(73) Assignees: Northrop Grumman Systems Corporation, Falls Church, VA (US); XARION Laser Acoustics GmbH, Vienna (AT)

( * ) Notice: Subject to any disclaimer, the term of this patent is extended or adjusted under 35 U.S.C. 154(b) by 41 days.

(21) Appl. No.: 16/863,115

(22) Filed: Apr. 30, 2020

(65) Prior Publication Data

US 2020/0348267 A1 Nov. 5, 2020

Related U.S. Application Data

(60) Provisional application No. 62/841,637, filed on May 1, 2019.

(51) Int. Cl.
*G01N 29/24* (2006.01)
*G01N 29/36* (2006.01)
*G01N 29/44* (2006.01)

(52) U.S. Cl.
CPC ......... *G01N 29/2418* (2013.01); *G01N 29/36* (2013.01); *G01N 29/4445* (2013.01)

(58) Field of Classification Search
CPC ............... G01N 29/2418; G01N 29/36; G01N 29/4445; G01N 29/265; G01N 29/343;
(Continued)

(56) References Cited

U.S. PATENT DOCUMENTS

| 4,295,738 A | 10/1981 | Meltz et al. |
| 4,379,409 A | 4/1983 | Primbsch et al. |

(Continued)

FOREIGN PATENT DOCUMENTS

| EP | 3173781 A1 | 5/2017 |
| WO | 2010/029509 A1 | 3/2010 |

OTHER PUBLICATIONS

Choi "Influence of slit width on harmonic generation in ultrasonic surface waves excited by masking a laser beam with a line arrayed slit" NDT&E International 57 (2013) 1-6.
(Continued)

*Primary Examiner* — Suman K Nath
(74) *Attorney, Agent, or Firm* — TraskBritt (57) ABSTRACT

Methods, devices, and systems for detecting one or more discontinuities of a structure may include a laser emitter configured to generate and direct an ultrasonic signal into a structure and a receiver comprising an optical microphone. The optical microphone may comprise an array of optical microphones configured in a complementary manner to the emitter.

19 Claims, 8 Drawing Sheets

(58) Field of Classification Search
CPC .. G01N 29/221; G01N 29/226; G01N 29/043; G01N 2291/2694; G01N 2291/048; G01N 2291/044; G01N 2291/102; G01N 2291/0231; G01N 21/88; G01N 21/1702; G01N 2201/0221; G01N 2201/8472; G01N 2201/1706
See application file for complete search history.

(56) References Cited

U.S. PATENT DOCUMENTS

| | | | |
|---|---|---|---|
| 4,567,769 A | 2/1986 | Barkhoudarian | |
| 5,099,693 A | 3/1992 | Payne et al. | |
| 5,760,904 A | 6/1998 | Lorraine et al. | |
| 6,144,685 A | 11/2000 | Iwasa et al. | |
| 6,901,157 B2 | 5/2005 | Ogawa | |
| 7,042,563 B2 | 5/2006 | Wilsher et al. | |
| 7,369,250 B2 | 5/2008 | Dubois et al. | |
| 7,576,848 B2 | 8/2009 | Dubois et al. | |
| 7,784,348 B2 | 8/2010 | Dubois et al. | |
| 7,791,739 B2 | 9/2010 | Dubois et al. | |
| 7,800,762 B2 | 9/2010 | Deaton et al. | |
| 7,865,316 B2 | 1/2011 | Turner et al. | |
| 8,109,160 B2 | 2/2012 | Bossi et al. | |
| 8,224,485 B2 | 7/2012 | Unsworth | |
| 8,301,029 B2 | 10/2012 | Fischer | |
| 8,312,773 B2 | 11/2012 | Fomitchov | |
| 9,164,066 B1 | 10/2015 | Bossi et al. | |
| 9,417,147 B2 | 8/2016 | Fischer et al. | |
| 9,641,941 B2 | 5/2017 | Fischer | |
| 2004/0003662 A1 | 1/2004 | Kenderian et al. | |
| 2005/0120803 A1 | 6/2005 | Sokol et al. | |
| 2008/0198386 A1* | 8/2008 | Hirata | G01B 9/02051 356/491 |
| 2009/0156932 A1 | 6/2009 | Zharov | |
| 2010/0139405 A1 | 6/2010 | Melikechi et al. | |
| 2010/0291599 A1 | 11/2010 | Tague et al. | |
| 2012/0304774 A1 | 12/2012 | Ishioka | |
| 2014/0116146 A1 | 5/2014 | Bossi et al. | |
| 2015/0233870 A1* | 8/2015 | Prinzhorn | G01B 17/025 73/643 |
| 2017/0108472 A1 | 4/2017 | Fischer | |
| 2020/0034495 A1 | 1/2020 | Riding et al. | |

OTHER PUBLICATIONS

Da Silva "Robust Shearography System for Inspection of Defects in Composite Material using Diffractive Optics" Proc. of SPIE vol. 10376, Aug. 24, 2017 (pp. 1037600-1037606).

European Extended Search Report and Opinion for European Application No. 20172351.7, dated Aug. 6, 2020, 9 pages.

* cited by examiner

FIG. 8

INSPECTION DEVICES WITH LASER EMITTERS AND OPTICAL MICROPHONES, AND RELATED SYSTEMS AND METHODS

CROSS-REFERENCE TO RELATED APPLICATION

This application claims the benefit under 35 U.S.C. § 119(e) of U.S. Provisional Patent Application Ser. No. 62/841,637, filed May 1, 2019, the disclosure of which is hereby incorporated herein in its entirety by this reference.

TECHNICAL FIELD

Embodiments of this disclosure relate generally to systems and methods for inspecting structures. In particular, embodiments of this disclosure relate to systems, devices, and methods employing ultrasound for inspecting structures, such as, for example, relatively large and/or complex composite structures, to identify characteristics, features, and/or discontinuities in the structures.

BACKGROUND

Inspection methods, such as nondestructive testing (NDT), include a wide array of measurement and analysis techniques used to evaluate properties, materials, components, and systems without causing damage. Ultrasonic testing is one method of nondestructive testing. Ultrasonic testing involves using generation of sound waves to inspect objects by directing the waves into an object and detecting transmitted, reflected and refracted sound waves emanating from the object. The object tested may be comprised of different types of materials. For example, the materials may be one or more of steel, metals, alloys, concrete, wood, composite materials, and other types of materials.

During ultrasonic testing, transducers send sound waves (e.g., very short pulses) (e.g., typically between 0.1 MHz and 100 MHz) into an object to be tested. Second sound waves (e.g., echoes) are received as a response to the first sound waves sent into the object. The response is analyzed for a number of different purposes. For example, the analysis may be used to characterize materials in the object, identify defects, and for other purposes.

Determining whether defects are present may be beneficial at multiple stages during the lifecycle of an object. Nondestructive testing may be beneficial, for example, during stages of manufacturing, immediately after manufacturing the object, after protracted storage of the object, while the object is in use, and/or during maintenance.

Conventionally, ultrasonic testing is performed using a coupling medium. For example, water, oil, a water-based gel, or some other flowable material may be used. The coupling medium is required to reduce the acoustic impedance between the transducer and the test object.

BRIEF SUMMARY

Some embodiments of the present disclosure may include an inspection device. The inspection device may include a laser emitter and a receiver. The laser emitter may be configured to produce, for example, a laser signal or laser emitting array, configured to generate and/or direct an ultrasonic signal into, on, or in a structure. The receiver may include one or more optical microphones. The optical microphone may comprise an array of optical microphones, which may, in some embodiments, be configured in a complementary manner to the laser signal. The receiver may be configured to receive the ultrasonic signal generated by the laser signal after at least a portion of the ultrasonic signal has passed at least partially through the structure.

Another embodiment of the present disclosure may include an inspection device. The inspection device may include a laser emitter, a beam adjustment feature (e.g., a beam expander), and a receiver. The laser emitter may be configured to generate and direct a laser beam onto the structure to generate an ultrasonic signal in the structure. The beam adjustment feature may be configured to alter the laser beam generated by the laser emitter into an expanded laser beam having at least one dimension that is greater than a corresponding dimension of the laser beam before the laser beam is altered. The receiver may include at least one optical microphone. The receiver may be configured to receive the ultrasonic signal generated by the laser beam after at least a portion of the ultrasonic signal has passed at least partially through the structure.

Another embodiment of the present disclosure may include a method for indicating one or more discontinuities in an object with an inspection device. The method may include moving a laser emitter of the inspection device along a surface of the object. The method may further include expanding a beam emitted by the laser emitter. The method may also include generating ultrasonic signals traveling through the object with the beam emitted by the laser emitter. The method may further include detecting the ultrasonic signals with a receiver of the inspection device comprising an optical microphone. The method may also include determining the one or more discontinuities in the object from a response from the ultrasonic signals.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, system, and process changes may be made without departing from the scope of the disclosure.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

Furthermore, specific implementations shown and described are only examples and should not be construed as the only way to implement the present disclosure unless specified otherwise herein. Elements, connections, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, voltages, currents, electromagnetic waves, magnetic fields or particles, optical fields or particles, or any combination thereof may represent data, instructions, commands, information, signals, bits, symbols, and chips that may be referenced throughout this description. Some drawings may illustrate information and signals as a single data packet or single signal for clarity of presentation and description. It will be understood by a person of ordinary skill in the art that the data packet or signal may represent a bus of signals or series of data packets. A bus may have a variety of bit widths and the present disclosure may be implemented on any number of data signals including a single data signal.

The embodiments may be described in terms of a process that is depicted as a flowchart, a flow diagram, a structure diagram, or a block diagram. Although a flowchart may describe operational acts as a sequential process, many of these acts may be performed in another sequence, in parallel, or substantially concurrently. In addition, the order of the acts may be rearranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

As used in this specification, the terms "substantially," "about," and "approximately" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even 100% met.

The phrase "at least one of" when used with a list of items means different combinations of one or more of the listed items may be used and only one of each item in the list may be needed. For example, "at least one of item A, item B, and item C" may include, without limitation, item A or item A and item B. This example may also include item A, item B, and item C, or item B and item C. In other examples, "at least one of" may be, without limitation, two of item A, one of item B, and 10 of item C; four of item B and seven of item C; and other suitable combinations.

As used in this disclosure, any relational term, such as "first," "second," "over," "top," "bottom," "side," etc., is used for clarity and convenience in understanding the disclosure and accompanying drawings and does not connote or depend on any specific preference, orientation, or order, except where the context clearly indicates otherwise.

As used in this disclosure, the term "and/or" means and includes any and all combinations of one or more of the associated listed items.

When one component is "associated" with another component, the association is a physical association in these examples. For example, a first component may be considered to be associated with a second component by being secured to the second component by welding, fasteners or connected to the second component in some other suitable manner. The first component may also be connected to the second component using a third, intervening component by which the first component may also be considered to be associated with the second component.

The illustrations presented in this disclosure are not meant to be actual views of any particular system or device, but are merely idealized representations that are employed to describe the disclosed embodiments. Thus, the drawings are not necessarily to scale and relative dimensions may have been exaggerated for the sake of clarity. Additionally, elements common between figures may retain the same or similar numerical designation.

The following description provides specific details in order to provide a thorough description of embodiments of this disclosure. However, a person of ordinary skill in the art will understand that the embodiments of this disclosure may be practiced without employing these specific details.

As discussed above, conventionally, ultrasonic testing generally requires a flowable coupling medium. For example, water, oil, a water-based gel, or some other liquid may be used. The coupling medium is used to reduce the acoustic impedance between the transducer and the test object. To maintain contact with the coupling medium the distance between the testing system and the test object (e.g., standoff distance) may need to be carefully controlled while closely matching the orientation of the transducer in a manner normal to the surfaces of the object being inspected. When the test object has complex surface geometry or a rough surface it can be difficult to maintain a standoff distance and/or contact with the coupling medium. A system that can efficiently inspect a test object non-destructively without the use of a liquid coupling medium may enable improved inspection of objects having complex geometry and/or rough surfaces. An approach that does not require coupling medium may include generating an ultrasound wave directly into an object using laser pulse excitation and receiving the second ultrasound waves using a noncontact receiver sensing device that can include a transducer, laser interferometer, or optical microphone.

Figure 1:
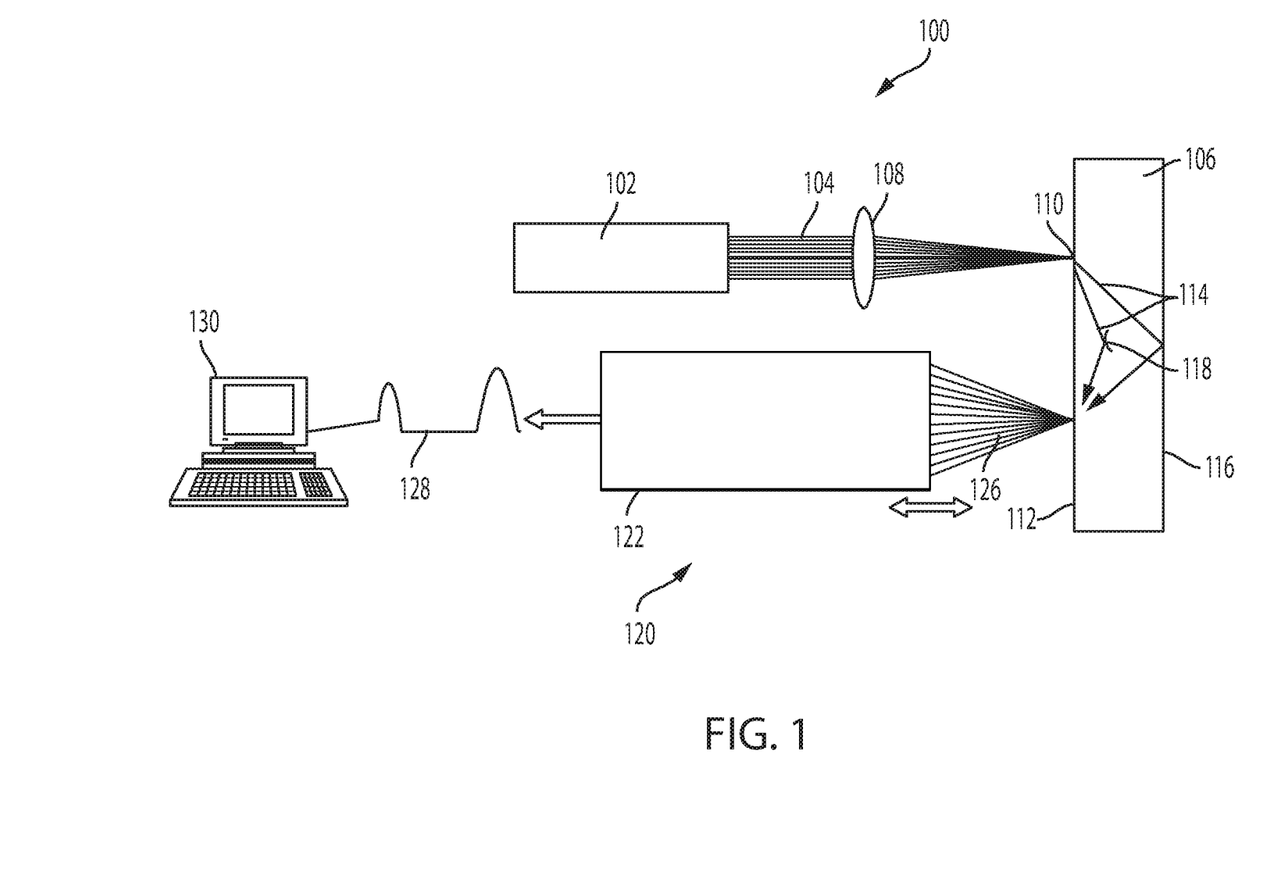
FIG. 1 is a diagrammatic simplified view of an ultrasonic inspection system according to an embodiment of the present disclosure.

FIG. 1 illustrates an embodiment of an ultrasonic inspection system 100, such as a non-contact laser ultrasonic inspection system. The ultrasonic inspection system 100 may include an emitter 102, such as a laser emitter, configured to generate a signal 104, such as a laser signal, directed toward an object 106 (e.g., inspection object, structure, test object, an object or structure undergoing non-destructive testing, etc.). The signal 104 may be laser light of various frequencies (e.g., visible light, infrared light, ultraviolet, etc.).

The object 106 to be inspected, which may also be characterized as a structure to be inspected, may take various forms. For example, the object 106 may comprise an aerospace structure such as, for example, an aircraft, or a component part thereof, such as an engine housing, a fuselage, a wing, a composite airfoil, a composite skin panel, a metal skin panel, a vertical stabilizer, a horizontal stabilizer, a joint, portions thereof, and/or some other component. Object 106 may also, for example, comprise some other mobile platform or a stationary platform in the form of a land-based structure, an aquatic-based structure, a space-based structure, a submarine, a bus, a personnel carrier, a tank, a train, an automobile, a spacecraft, a space station, a surface ship, or other suitable object.

The ultrasonic inspection system 100 may be selected from one of a handheld system, portable system, motorized system, or other suitable configurations. For example, the ultrasonic inspection system 100 may be a handheld system that may be operated by one or more hands of an operator. The ultrasonic inspection system 100 may be a portable system that may be moveable by the operator or more than one operator. The ultrasonic inspection system 100 may be a motorized system that may move without force applied by the operator, for example, a robotic system.

The signal 104 may pass through a beam adjustment feature 108 (e.g., a beam or signal processor configured to optically, mechanically, and/or electrically modify the beam or signal). In some embodiments, the beam adjustment feature 108 may be configured for the signal 104 to pass through the beam adjustment feature 108 (e.g., a transparent device, refracting device, diffracting device, etc.) such as a lens. In some embodiments, the beam adjustment feature 108 may be configured to alter (e.g., redirect, reflect, modify a cross-sectional shape, expand, focus, refract, diffract) the signal 104 (e.g., a beam expander utilizing objective and image lenses) utilizing optical elements. In some embodiments, the beam adjustment feature 108 may be an assembly of multiple lenses, plates, gratings, attenuators, filters, apertures, diaphragms, slits, optical cavities, electro-optic modulators, acousto-optic modulators, and/or mirrors. In some embodiments, the beam adjustment feature 108 may be a beam splitter configured to project a 1D or 2D array pattern. In some embodiments, the beam adjustment feature 108 may be used to temporarily adjust the signal 104, which may be a beam, to synchronize with a receiver.

The beam adjustment feature 108 may focus and/or expand the signal 104 (e.g., laser spot, laser beam, etc.). For example, the beam adjustment feature 108 may have a focal point 110 at or near a first surface 112 of the object 106. In some embodiments, the beam adjustment feature 108 may modify the signal 104 to have a wider area circular pattern. In some embodiments, the beam adjustment feature 108 may modify the signal 104 to have a polygonal cross section (e.g., a substantially rectangular pattern defining the signal 104 or another elongated signal having a polygonal or oval shape). For example, a signal 104 having a shape of substantially uniform cross-sectional dimension (e.g., a substantially round or square cross section) may be modified to have an elongated shape (e.g., an elongated range having a length that is multiple times larger than the width). In some embodiments, the beam adjustment feature 108 may modify the signal 104 to form a line.

The emitter 102 may be configured to pulse the signal 104. As the pulsed signal 104 impinges on the first surface 112 of the object 106, ultrasonic wave signals are generated near the first surface 112 and ultrasonic return signals (e.g., secondary ultrasonic waves 114) may be produced within the object 106. Because the pulsed signal 104 produced by the emitter 102 is optical, rather than acoustic, the pulsed signal 104 is not as susceptible to acoustic impedance. Therefore, the pulsed signal 104 may be transmitted across a gas (e.g., air, atmospheric air, etc.), plasma, or vacuum without the aid of a coupling medium (e.g., a liquid coupling mechanism).

Initial ultrasonic waves and the secondary ultrasonic waves 114 may pass completely or at least partially through the object 106 (e.g., the incoming signal 104, which may be a laser signal, generates secondary ultrasonic waves 114). The secondary ultrasonic waves 114 may reflect off different structures within the object 106. For example, the secondary ultrasonic waves 114 may reflect off or transmit through a second surface 116 on a side of the object 106 opposite the position of the emitter 102. The secondary ultrasonic waves 114 may also reflect off a characteristic (e.g., a defect 118) within the object 106. The defect 118 may include a structural feature, a pocket of unexpected material, a volume lacking an expected material, an inconsistency, an anomaly, a void, an air bubble, a delamination, a disbond, an unbond, a resin pocket, an unexpected change in material and/or structure, a discontinuity, an anomaly, material change, a density change, a non-uniform area or volume, some other type of change in the structure, or combinations thereof. The reflections of the secondary ultrasonic waves 114 may return to the first surface 112 or pass through the second surface 116 of the object 106.

The initial ultrasonic waves and the secondary ultrasonic waves 114 may be received (e.g., read, captured, etc.) by a receiver 120 as an airborne ultrasonic (e.g., acoustic) signal 126. The receiver 120 may comprise a signal receiving feature such as, for example, at least one microphone 122 (e.g., an optical microphone). In some embodiments, the microphone 122 may be an array of microphones. The receiver 120 may have a receiving area that is sized and configured to be capable of receiving a substantial entirety of the airborne ultrasonic signal 126 in the modified cross section that is provided by the beam adjustment feature 108 as it travels to the receiver 120 from the object 106. For example, the cross-sectional area for the receiving area may be substantially similar to the cross-section area of the airborne ultrasonic signal 126 as it is modified by the beam adjustment feature 108 as it travels to the receiver 120 from the object 106.

The microphone 122 may be configured to convert the secondary ultrasonic waves 114 present in the airborne ultrasonic signal 126 to an electrical signal 128 that may be interpreted or stored in a processing device 130. For example, the airborne ultrasonic signal 126 may be converted to an optical signal by the microphone 122 as discussed in further detail below with respect to FIGS. 2 and 3. The optical signal may then be converted to the electrical signal 128 that may then be sent to the processing device 130.

The processing device 130 may include a remote or local computer (e.g., personal computers, workstations, laptops, tablets, mobile phones, wearable devices, and computer-servers, etc.), a controller (e.g., a control board, a microcontroller, a microchip, an integrated circuit, etc.), a multimedia storage device (e.g., hard drive, flash memory, disc drive, etc.), a display, etc. In some embodiments, the processing device 130 may be connected directly to the receiver 120. In some embodiments, the processing device 130 may receive the electrical signal 128 through a communication network (e.g., PAN, LAN, WAN, etc.), such as a wired network or a wireless communication network.

In some embodiments, the receiver 120 may include local storage for storing data. In some embodiments, the receiver 120 may perform at least a portion of the analysis. For example, the receiver 120 may output a trigger identifying an anomaly, a defect, structural inconsistencies, etc. In some embodiments, the receiver 120 may record data from an inspection to local storage and upload the data to the processing device 130 after the inspection is terminated through a direct connection (e.g., dock, USB, DB9, SATA, RJ45, etc.).

The position of the ultrasonic inspection system 100 may be encoded to track the position of the receiver 120. For example, for a receiver 120 comprising a portable scan receiver head, an encoder may be attached directly to the receiver 120 to provide position information and to generate a digitized image and position of any defects 118 detected by the receiver 120. In another embodiment, the receiver 120 may be attached to a robot that provides the digitized image and position of any defects 118 detected by the receiver 120.

The position of the ultrasonic inspection system 100 may be determined using mapping and/or tracking. For example, some embodiments may use a laser tracking system similar to those described in, for example, U.S. patent application Ser. No. 16/048,097, filed Jul. 27, 2018, and titled "SYSTEMS, DEVICES, AND METHODS FOR GENERATING A DIGITAL MODEL OF A STRUCTURE," the disclosure of which is incorporated herein in its entirety by this reference. The position of the ultrasonic inspection system 100 may be used to record a position of any defects 118 detected by the receiver 120.

The processing device 130 may be configured to generate a 2-D or 3-D model of the object 106 using both the data detected by the ultrasonic inspection system 100 relating the characteristics of the object 106 and location data from the mapping or tracking device.

The processing device 130 may generate various representations, markers, and/or icons indicating in the model locations, sizes, and/or depths of the defects 118 detected by the receiver 120. The processing device 130 may be configured to generate various notifications and/or alerts indicating in the model when and/or where specific defects 118 are found. In some embodiments, the processing device 130 may generate graphical representations, including 2-D and 3-D graphical representations, indicating within the model and/or modeling the various defects 118 within the object 106 that is being modeled.

In some embodiments, the microphones 122 disclosed herein may be somewhat similar to those described in, for example, U.S. Pat. No. 8,301,029, issued on Oct. 30, 2012, and titled "ELECTROACOUSTIC TRANSDUCER," U.S. Pat. No. 9,417,147, issued on Aug. 16, 2016, and titled "OPTICAL SENSOR," U.S. Pat. No. 9,641,941, issued on May 2, 2017, and titled "TRANSDUCER SYSTEM," and U.S. patent application Ser. No. 15/360,364 published Apr. 20, 2017, and titled "AIRBORN ULTRASOUND TESTING SYSTEM FOR A TEST OBJECT" the disclosure of each of which is incorporated herein in its entirety by this reference.

Figure 2:
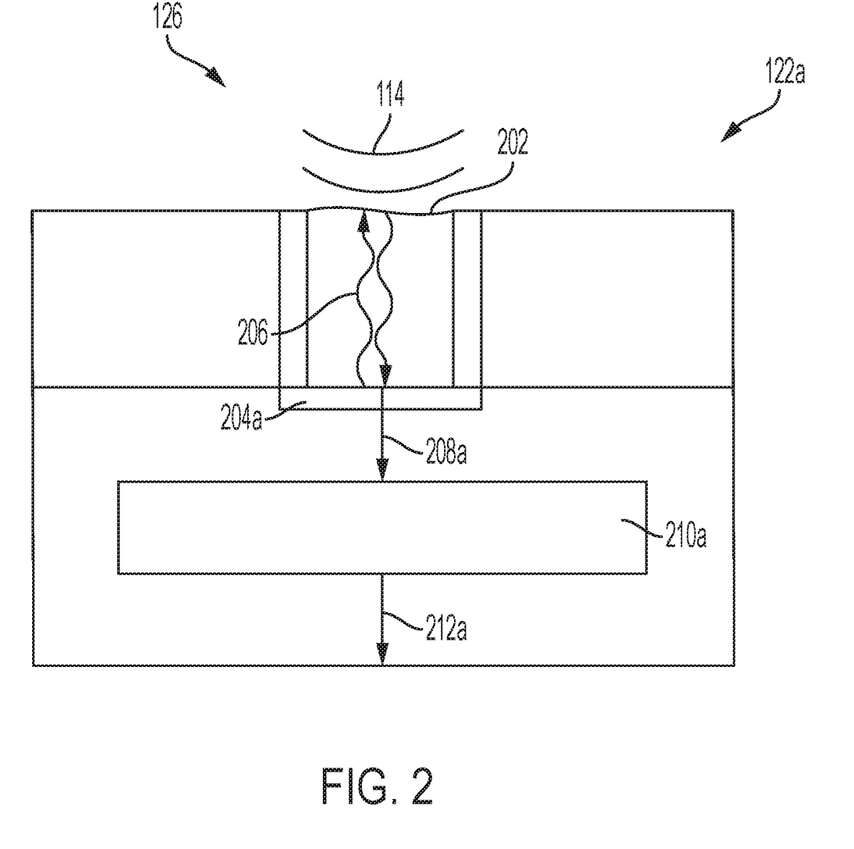
FIG. 2 is a simplified view of an optical microphone according to an embodiment of the present disclosure.

FIG. 2 illustrates an embodiment, of a signal receiver, e.g., a microphone 122$a$, where the receiver 120 (FIG. 1) may include one or more of the microphones 122$a$ as the microphone 122. In some embodiments, the microphone 122$a$ may include a membrane 202 (e.g., flexible membrane, diaphragm, etc.). The membrane 202 may be configured to receive the airborne ultrasonic signal 126 in the form of secondary ultrasonic waves 114 traveling from the object 106 (FIG. 1). The secondary ultrasonic waves 114 may cause the membrane 202 to move or flex. The microphone 122$a$ may convert movements of the membrane 202 into an electrical signal. In some embodiments, the microphone 122$a$ may detect movement of the membrane 202 with a sensor, such as, for example, an optical sensor 204$a$. The optical sensor 204$a$ may include a light source configured to generate a light beam 206 directed toward the membrane 202. The light beam 206 may reflect off the membrane 202 and return to the optical sensor 204$a$. The optical sensor 204$a$ may transfer an optical signal 208$a$ of the light beam 206 to a conversion circuit 210$a$. The conversion circuit 210$a$ may convert the optical signal 208$a$ to an electrical signal 212$a$ that may be interpreted or stored in a processing device 130 (FIG. 1). In some embodiments, the movement of the membrane 202 may be captured mechanically and converted into an electrical signal without the use of the optical sensor 204$a$.

Figure 3:
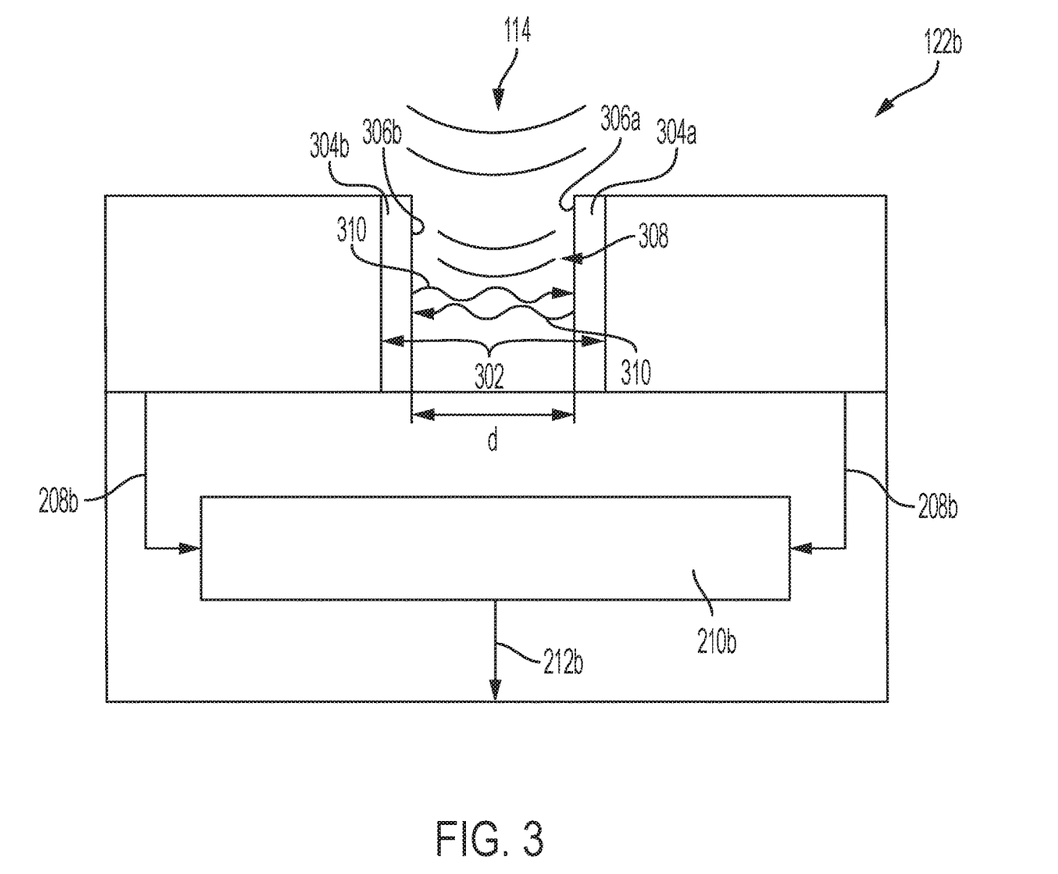
FIG. 3 is a simplified view of an optical microphone according to an embodiment of the present disclosure.

FIG. 3 illustrates another embodiment of a microphone 122$b$. In some embodiments, the microphone 122$b$ may be an optical microphone, where the receiver 120 (FIG. 1) may include one or more of the microphones 122$b$ as the microphone 122. The microphone 122$b$ may include an interferometer 302, which includes a first mirror 304$a$ having a first light reflective surface 306$a$ and a second mirror 304$b$ having a second light reflective surface 306$b$. The two mirrors 304$a$, 304$b$ are spaced from one another by a distance d. The distance d may be between about 0.05 mm and about 5 mm, such as between about 1 mm and about 3 mm, between about 1.5 mm and about 2.5 mm, or about 2 mm. The two mirrors 304$a$, 304$b$ may define a space 308 between the two mirrors 304$a$, 304$b$ that is acoustically coupled with a surrounding environment so that the secondary ultrasonic waves 114 from the first surface 112 of the object 106 may propagate into the space 308. The two mirrors 304$a$, 304$b$ may be arranged in a plane-parallel to one another and be spatially fixed (e.g., not elongated or moved in the presence of the secondary ultrasonic waves 114). In some embodiments, the microphone 122$b$ may only include static components (e.g., the microphone may be free of any membrane or other movable component). The mirrors 304$a$, 304$b$ may be configured to at least partially reflect a light beam 310, which propagates multiple times between the reflective surfaces 306$a$, 306$b$ of the two mirrors 304$a$, 304$b$. The secondary ultrasonic waves 114 may interfere with the light beam 310. The microphone 122$b$ may convert the secondary ultrasonic waves 114 into an optical signal 208$b$ through the interference in the light beam 310. The optical signal 208$b$ may then be converted into an electrical signal 212$b$ by the conversion circuit 210$b$. The electrical signal 212$b$ may be interpreted or stored in a processing device 130 (FIG. 1).

Figure 4:
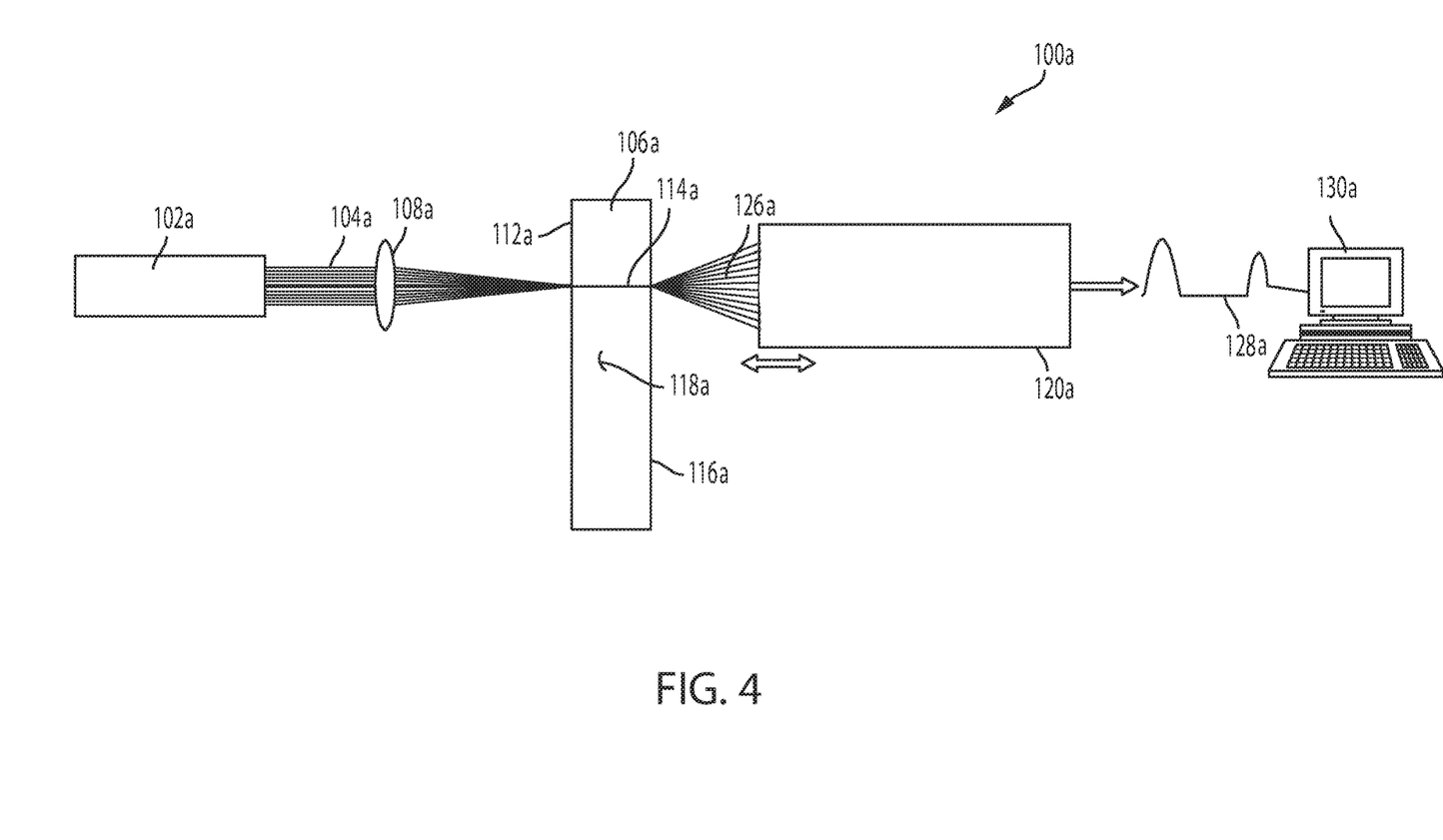
FIG. 4 is a simplified diagrammatic view of an ultrasonic inspection system according to an embodiment of the present disclosure.

FIG. 4 illustrates an embodiment of an ultrasonic inspection system 100$a$ configured for a through-transmission, which may include at least some of the components discussed above. The ultrasonic inspection system 100a may be arranged with an emitter 102a on a first side of an object 106a (e.g., an inspection object) and a receiver 120a on a second side of the object 106a opposite the emitter 102a. A signal 104a (e.g., a laser signal) from the emitter 102a may pass through the object 106a. The signal 104a from the emitter 102a may induce a signal within the object 106a. For example, the emitter 102a may be a pulsed laser. Laser pulses may impinge on a first surface 112a of the object 106a. As the laser pulses impinge on the first surface 112a of the object 106a secondary ultrasonic waves 114a may be induced within the object 106a.

The emitter 102a may include a beam adjustment feature 108a configured to split, modify, expand, and/or focus the signal 104a. For example, the beam adjustment feature 108a may alter the signal 104a such that the signal 104a contacts an area of the first surface 112a of the object 106a that is different from a cross-sectional area of the signal 104a as it leaves the emitter 102a. The modified signal 104a, which may be concentrated in certain dimensions and expanded in other dimensions, may induce secondary ultrasonic waves 114a (e.g., shock waves, ultrasonic waves, etc.) at broadband frequencies. The secondary ultrasonic waves 114a may pass through the object 106a. When the secondary ultrasonic waves 114a encounter defects 118a within the object 106a, portions (e.g., at least part, a substantial portion, etc.) of the secondary ultrasonic waves 114a may be reflected back in a direction toward the emitter 102a. The secondary ultrasonic waves 114a that reach a second surface 116a opposite the emitter 102a may be received by the receiver 120a.

The receiver 120a may convert the airborne ultrasonic signal 126a from secondary ultrasonic waves 114a to an electrical signal 128a that may be transmitted to a processing device 130a. The processing device 130a may evaluate the electrical signal 128a to determine the presence of defects 118a within the object 106a. For example, in areas with no defects 118a substantially all of the secondary ultrasonic waves 114a that originate at the first surface 112a may exit the second surface 116a in the airborne ultrasonic signal 126a. As the ultrasonic inspection system 100a approaches an area with a defect 118a, at least a portion of the secondary ultrasonic waves 114a may be reflected back toward the emitter 102a. The reflected portion of the secondary ultrasonic waves 114a may not reach the second surface 116a of the object. Therefore, the secondary ultrasonic waves 114a exiting the second surface 116a of the object in the airborne ultrasonic signal 126a may only be the portion of the secondary ultrasonic waves 114a that were not reflected by the defect 118a. The changes in the airborne ultrasonic signal 126a resulting from such reflections may be captured and/or recorded by at least one of the receiver 120a and the processing device 130a.

Figure 5:
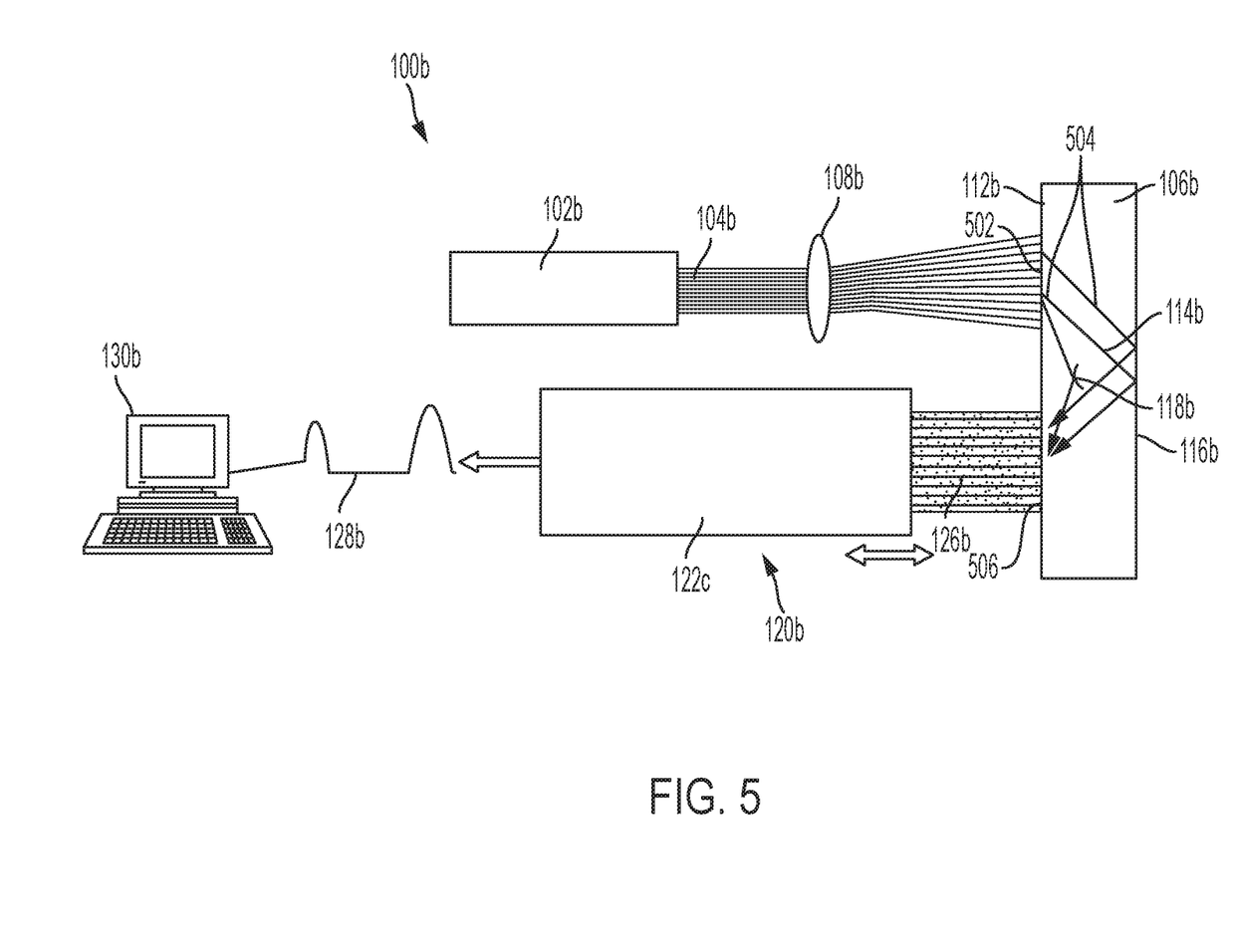
FIG. 5 is a simplified diagrammatic view of an ultrasonic inspection system according to an embodiment of the present disclosure.

An ultrasonic inspection system where the signal is focused on a larger area of an object may enable the object to be inspected in less time. FIG. 5 illustrates an embodiment of the ultrasonic inspection system 100b. In a similar manner to that discussed above, a beam adjustment feature 108b (e.g., a beam expander) may be configured to expand a signal 104b (e.g., a laser signal) such that at least one dimension of the area contacted by the signal 104b on an object 106b (e.g., an inspection object) is larger than at least one dimension of the cross-section of the signal 104b as it leaves an emitter 102b. In some embodiments, the signal 104b may comprise an array of lasers (e.g., an array of laser beams, an array of emitters 102b) contacting a first surface 112b in an emitting array corresponding to a shape and orientation of the array of emitters 102b. The larger area contacted by the signal 104b may cover an array of multiple inspection points on the first surface 112b. The beam adjustment feature 108b may expand the signal 104b to a larger cross-section. In some embodiments, the beam adjustment feature 108b may adjust a shape of the cross-section of the signal 104b, for example, changing a cross-sectional shape of the signal 104b from a circle to an oval or from a circle to a rectangle, a line, a square, a triangle, a ring, or another geometrical form.

After the signal 104b passes through the beam adjustment feature 108b the expanded signal may impinge on the first surface 112b of the object 106b as an array 502 (e.g., emitting array). The signal 104b may be pulsed such as a pulsed laser. The pulses of the signal 104b may produce secondary ultrasonic waves 114b within the object 106b similar to the embodiments described in FIGS. 1 and 4. Due to the enlarged contact area of the emitting array 502, the secondary ultrasonic waves 114b may be generated over a corresponding larger area as an interference pattern (e.g., a secondary wave interference pattern 504, superposition wave pattern, etc.). The secondary ultrasonic waves 114b may reflect off defects 118b within the object 106b. The secondary ultrasonic waves 114b may also reflect off a second surface 116b of the object 106b. The reflections of the secondary ultrasonic waves 114b may exit the first surface 112b toward a receiver 120b.

An airborne ultrasonic signal 126b leaving the first surface 112b of the object 106b may be a temporally or spatially separated airborne ultrasonic wave pattern signal 506 (e.g., ultrasonic signal signals separated by space and/or in time) corresponding to the secondary wave interference pattern 504. The receiver 120b may include an array of microphones 122c configured to capture the airborne ultrasonic wave pattern signal 506 from the first surface 112b of the object 106b. The array of microphones 122c may be arranged in a complementary manner to the airborne ultrasonic wave pattern signal 506. The array of microphones 122c may enable the receiver 120b to capture and analyze larger groupings of data enabling the ultrasonic inspection system 100b to inspect an object in less time. Similar to the embodiments described in FIGS. 1 and 4, the receiver 120b may convert the airborne ultrasonic wave pattern signal 506 to an electrical signal 128b that may then be transmitted to a processing device 130b.

Figure 6:
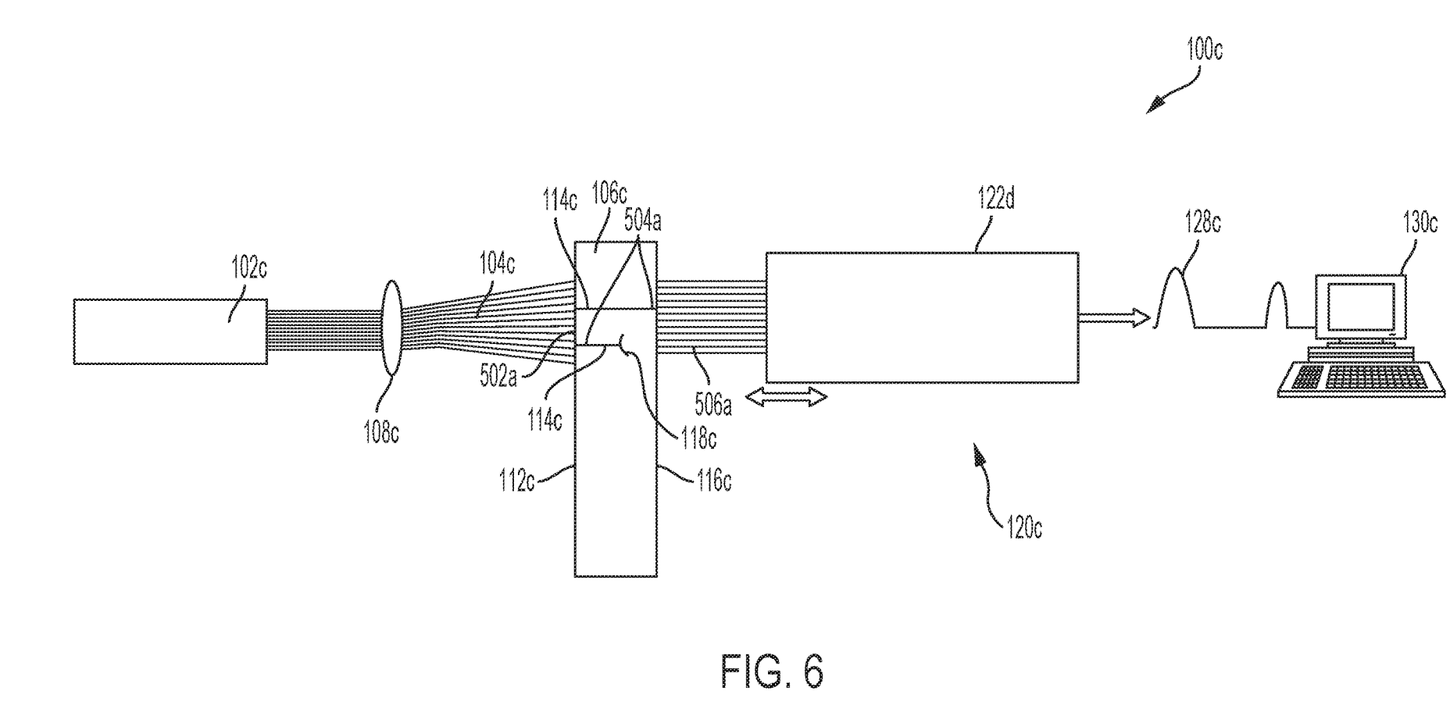
FIG. 6 is a simplified diagrammatic view of an ultrasonic inspection system according to an embodiment of the present disclosure.

FIG. 6 illustrates another embodiment of an ultrasonic inspection system 100c configured for a through-transmission. The ultrasonic inspection system 100c may be arranged with an emitter 102c (e.g., a pulsed laser) on a first side of an object 106c (e.g., an inspection object) and a receiver 120c on a second side of the object 106c opposite the emitter 102c. The emitter 102c may provide a signal 104c (e.g., a pulsed laser signal) directed toward the object 106c. The signal 104c may impinge on a first surface 112c of the object 106c. As the signal 104c impinges on the first surface 112c of the object 106c secondary ultrasonic waves 114c may be induced within the object 106c.

The emitter 102c may include a beam adjustment feature 108c (e.g., a beam expander) configured to expand the signal 104c. For example, the beam adjustment feature 108c may expand the signal 104c such that the signal 104c contacts an area of the first surface 112c of the object 106c with at least one dimension that is larger than the same dimension of the cross-sectional area of the signal 104c as it leaves the emitter 102c. The signal 104c may define an emitting array 502a at the point of contact with the first surface 112c. The emitting array 502a may induce secondary ultrasonic waves 114c (e.g., shock waves, ultrasonic waves, etc.) in a corresponding secondary wave interference pattern 504a encompassing the corresponding area of the object 106c. The secondary ultrasonic waves 114c may pass through the object 106c. When the secondary ultrasonic waves 114c encounter defects 118c within the object 106c, portions (e.g., at least part, a substantial portion, etc.) of the secondary ultrasonic waves 114c may be reflected back in a direction toward the emitter 102c. The secondary ultrasonic waves 114c that reach a second surface 116c opposite the emitter 102c may be received by a receiver 120c as an airborne ultrasonic wave pattern signal 506a. The receiver 120c may include an array of microphones 122d. The array of microphones 122d may be configured to capture substantially the entire airborne ultrasonic wave pattern signal 506a leaving the second surface 116c of the object 106c.

The receiver 120c may convert the airborne ultrasonic wave pattern signal 506a from secondary ultrasonic waves 114c to an electrical signal 128c that may be transmitted to a processing device 130c. The processing device 130c may evaluate the electrical signal 128c to determine the presence of defects 118c within the object 106c. For example, in areas with no defects 118c substantially all of the secondary ultrasonic waves 114c in the secondary wave interference pattern 504a originating at the first surface 112c may exit the second surface 116c in the airborne ultrasonic wave pattern signal 506a. In areas with a defect or additional structure, at least a portion of the secondary ultrasonic waves 114c may be reflected back toward the emitter 102c. The reflected portion of the secondary ultrasonic waves 114c may not reach the second surface 116c of the object 106c. Therefore, the secondary ultrasonic waves 114c exiting the second surface 116c of the object 106c in the airborne ultrasonic wave pattern signal 506a may only be the portion of the secondary ultrasonic waves 114c that were not reflected by the defects 118c. The different microphones 122d in the array may correspond to different portions of the area of the second surface 116c where the airborne ultrasonic wave pattern signal 506a is exiting. Each microphone 122d may capture the secondary ultrasonic waves 114c that correspond to each respective area and the differences in the airborne ultrasonic wave pattern signal 506a resulting from the reflections may be captured and/or recorded by at least one of the receiver 120c and the processing device 130c.

Figure 7:
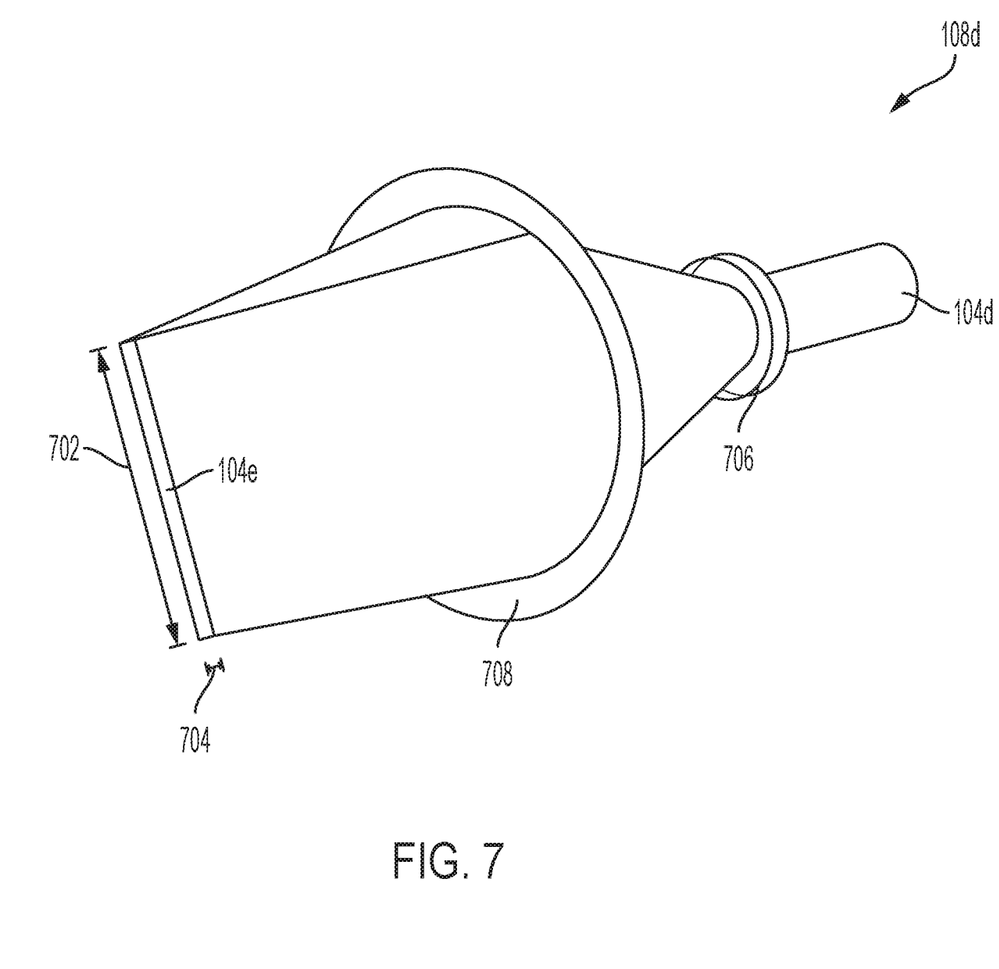
FIG. 7 is a simplified perspective view of a beam adjustment feature according to an embodiment of the present disclosure.

In some embodiments, it may be desirable to optically concentrate a signal to be concentrated at a first surface of an object to generate stronger secondary ultrasonic waves. FIG. 7 illustrates an embodiment of a beam adjustment feature 108d. In some embodiments, an emitter may provide a signal in the form of a beam of light 104d (e.g., a laser beam). The beam adjustment feature 108d may reduce one dimension of the beam of light 104d while increasing another dimension. For example, the beam of light 104d may leave an emitter as a substantially circular beam of light 104d. The beam adjustment feature 108d may be configured to increase a first dimension 702 while decreasing a second orthogonal dimension 704 such that the beam of light 104d contacts a first surface of an object as a substantially rectangular beam of light 104e (e.g., line, slit, etc.).

In some embodiments, the beam adjustment feature 108d may include multiple lenses, mirrors, etc. For example, a first lens 706 may expand the beam of light 104d to a larger cross-sectional area. A second lens 708 may concentrate the beam of light 104d in the second orthogonal dimension 704 while maintaining the beam of light 104d at substantially the same dimension in the first dimension 702. In some embodiments, one or more of the first lens 706 and the second lens 708 may be replaced with a mirror configured to generate the same or a similar effect on the beam of light 104d through reflection instead of refraction. For example, the beam of light 104d may pass through the first lens 706 expanding to the larger cross-sectional area through refraction. The beam of light 104d may then reflect off a mirror configured to concentrate the beam of light 104d in the second orthogonal dimension 704 while maintaining the beam of light 104d at substantially the same dimension in the first dimension 702 similar to the second lens 708.

Figure 8:
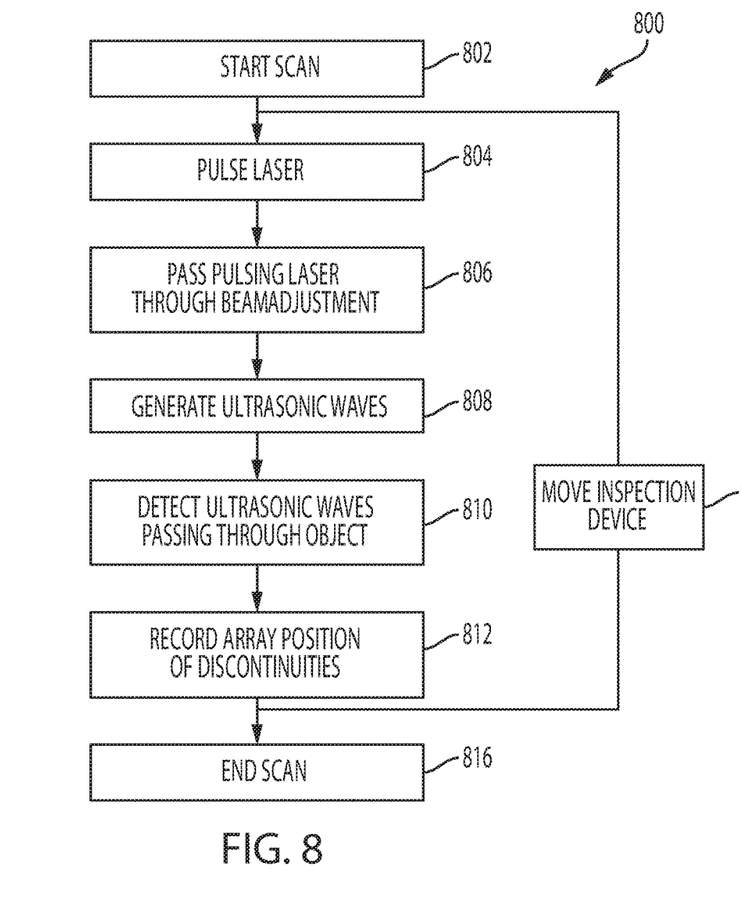
FIG. 8 is a flow diagram of a method of inspecting an object according to an embodiment of the present disclosure.

FIG. 8 depicts, in the form of a flow diagram, an embodiment of a method 800 for inspecting an object for discontinuities (e.g., structural features, pockets of unexpected material, volumes lacking an expected material, surface discontinuities, inconsistencies, anomalies, voids, air bubbles, delamination, resin pockets, unexpected changes in material and/or structure, material changes, density changes, and other types of defects or changes in the structure, etc.) by through-transmission. Reference is also made to FIGS. 4 and 6 to refer to example components of the ultrasonic inspection systems 100a, 100c that may be implemented in some embodiments.

In operation, the scan starts at act 802. When the scan starts the emitter 102a, 102c may begin pulsing a laser with the beam of the laser directed toward the inspection object 106a, 106c at act 804. The beam of the laser may pass through the beam adjustment feature 108a, 108c in act 806. The beam adjustment feature 108a, 108c may be configured to change at least one of a size and shape of the cross section of the laser beam. The beam adjustment feature 108a, 108c may be configured to change the cross section of the laser beam to a size and/or shape that corresponds to the receiver 120a, 120c. For example, if the receiver 120a, 120c has a single microphone 122d the laser beam may be contracted to a small point of contact corresponding with the microphone 122d input. In another example, if the receiver 120a, 120c includes an array of microphones 122d, the laser beam may be changed to a size, shape, and/or pattern that compliments the size, shape and/or pattern of the array of microphones 122d in the receiver 120a, 120c.

The beam of the laser may impinge on the first surface 112a, 112c of the object 106a, 106c. The impact of the pulses of the laser with the first surface 112a may generate secondary ultrasonic waves 114a, 114c within the object 106a, 106c at act 808. The secondary ultrasonic waves 114a, 114c may travel through the object 106a, 106c from the first surface 112a, 112c to the second surface 116a, 116c in a direction either substantially orthogonal to the first surface 112a, 112c and/or in a direction substantially parallel to the first surface 112a, 112c depending on the ultrasonic wave modes generated as part of the secondary ultrasonic wave 114a, 114c. As the secondary ultrasonic waves 114a, 114c travel through the object 106a, 106c, the secondary ultrasonic waves 114a, 114c may encounter discontinuities within the object 106a, 106c. When the secondary ultrasonic waves 114a, 114c encounter the discontinuities, a characteristic of the secondary ultrasonic waves 114a, 114c may change responsive to contact with the discontinuity. For example, the discontinuity may deflect the secondary ultrasonic wave 114a, 114c in a different direction or the discontinuity may reflect the secondary ultrasonic wave 114a, 114c in a direction toward the first surface 112a, 112c. In another example, the discontinuity may create a dampening, scattering, or resistance to the secondary ultrasonic wave 114a, 114c causing the secondary ultrasonic wave 114a, 114c to reduce in amplitude or speed. In some embodiments, the discontinuity may reduce a dampening, scattering, resistance relative to other portions of the object 106a, 106c enabling the secondary ultrasonic wave 114a, 114c to retain amplitude or travel at a higher rate of speed than the secondary ultrasonic waves 114a, 114c in other portions of the object 106a, 106c.

When the secondary ultrasonic waves 114a, 114c reach the second surface 116a, 116c of the object 106a, 106c, the secondary ultrasonic waves 114a, 114c may exit the object 106a, 106c. The secondary ultrasonic waves 114a, 114c may then be captured by the receiver 120a, 120c in act 810. The receiver 120a, 120c may utilize an optical microphone 122d to convert the secondary ultrasonic waves 114a, 114c into an electric signal 128a, 128c. Anomalies in the secondary ultrasonic waves 114a, 114c may be detected and noted as a discontinuity of the object 106a, 106c. In some embodiments, the type of anomaly in the secondary ultrasonic waves 114a, 114c may be analyzed to indicate one or more of a size of the discontinuity, a depth of the discontinuity, a type of discontinuity, etc. In some embodiments, at least a portion of the analysis may take place in the receiver 120a, 120c. For example, the receiver 120a, 120c may include a circuit board (e.g., micro-controller, integrated circuit, etc.) configured to detect the presence of an anomaly in the secondary ultrasonic waves 114a, 114c. In some embodiments, analysis of the secondary ultrasonic waves 114a, 114c may take place in the processing device 130a, 130c. For example, the receiver 120a, 120c may receive and convert the secondary ultrasonic waves 114a, 114c to an electrical signal 128a, 128c that may then be relayed to the processing device 130a, 130c with or without any initial analysis. The processing device 130a, 130c may conduct analysis of the electrical signal 128a, 128c, for example, determining the presence of an anomaly in the signal, the relevance of the anomaly (e.g., if the anomaly in the signal is a type that likely corresponds to a discontinuity in the object), characteristics of a detected discontinuity, etc.

The position of the receiver 120a, 120c may be recorded along with the presence of a discontinuity in act 812. In embodiments where the receiver 120a, 120c includes more than one optical microphone 122d arranged in an array, individual microphones 122d may record an anomaly where other microphones 122d in the array do not. The array position of the microphone 122d that detects the anomaly may be recorded along with the position of the receiver 120a, 120c to provide accurate positioning data. In some embodiments, a single discontinuity may affect the signal received by multiple microphones 122d in the array by varying degrees. For example, the secondary ultrasonic waves 114a, 114c passing by a discontinuity may be affected by the discontinuity to a lesser degree than the secondary ultrasonic waves 114a, 114c passing directly through the discontinuity. In another example, the secondary ultrasonic waves 114a, 114c that encounter a discontinuity may reflect or deflect into adjacent secondary ultrasonic waves 114a, 114c generating a small disturbance such as an echo or shadow. Capturing the data from an array may enable the ultrasonic inspection system 100a, 100c to pin point a discontinuity and eliminate echoes and/or shadows from consideration. In another example, the effect of the discontinuity felt by adjacent microphones 122d may indicate a characteristic of the discontinuity that may be recorded by the processing device 130a, 130c or the receiver 120a, 120c.

After the information is recorded, the ultrasonic inspection system 100a, 100c may move to a new location on the object 106a, 106c to continue the inspection in act 814. In some embodiments, new location may be an adjacent location. For example, the ultrasonic inspection system 100a, 100c may be moving across a large object in a line (e.g., row, column, etc.). In some embodiments, the new location may be far removed. For example, the ultrasonic inspection system 100a, 100c may be used to spot check an object, such as only inspecting known areas of potential failure. Once the ultrasonic inspection system 100a, 100c has arrived in the new location, the process may then be repeated until the scan ends in act 816.

Figure 9:
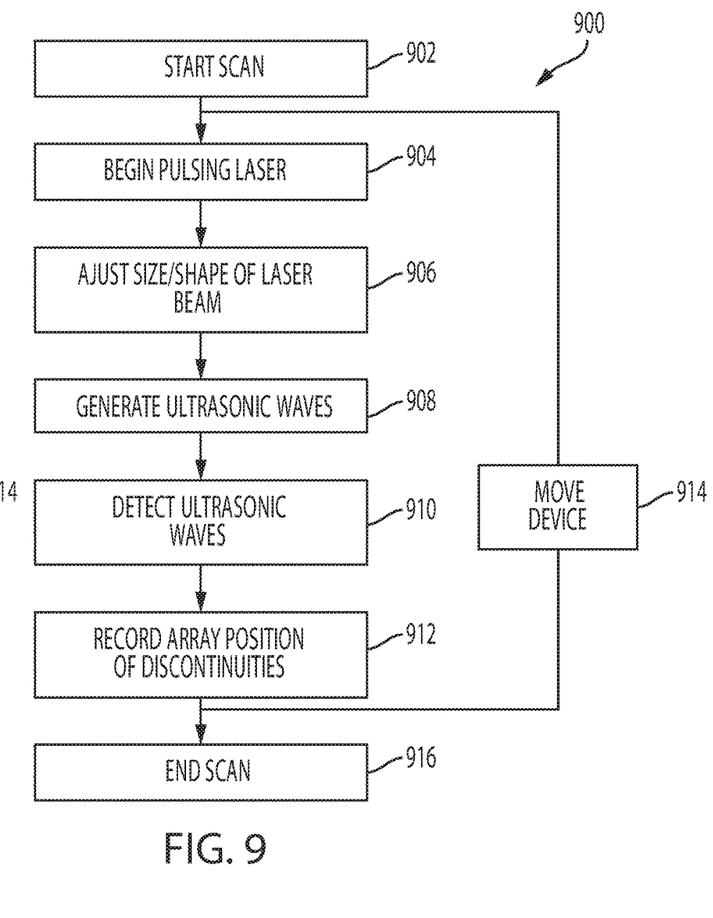
FIG. 9 is a flow diagram of a method of inspecting an object according to an embodiment of the present disclosure.

FIG. 9 depicts, in the form of a flow diagram, an embodiment of a method 900 for inspecting an object for discontinuities in a one-sided inspection configuration. Reference is also made to FIGS. 1 and 5 to refer to example components of the ultrasonic inspection system 100 that may be implemented in some embodiments.

In operation, the scan starts at act 902. When the scan starts the emitter 102, 102b may begin pulsing a laser with the beam of the laser directed toward the inspection object 106, 106b at act 904. The beam of the laser may pass through the beam adjustment feature 108, 108b in act 906. The beam adjustment feature 108, 108b may be configured to change at least one of a size and shape of the cross-section of the laser beam. The beam adjustment feature 108, 108b may be configured to change the cross-section of the laser beam to a size and/or shape that corresponds to the receiver 120, 120b.

The beam of the laser may impinge on the first surface 112, 112b of the object 106, 106b. The impact of the pulses of the laser with the first surface 112, 112b may generate secondary ultrasonic waves 114, 114b within the object 106, 106b at act 908. The secondary ultrasonic waves 114 may travel through the object 106, 106b from the first surface 112, 112b to the second surface 116, 116b in a direction either substantially orthogonal to the first surface 112, 112b and/or in a direction substantially parallel to the first surface 112, 112b depending on the ultrasonic wave modes generated as part of the secondary ultrasonic wave 114, 114b. When the secondary ultrasonic waves 114, 114b encounter the discontinuities, a characteristic of the secondary ultrasonic waves 114, 114b may change responsive to contact with the discontinuity. For example, the discontinuity may deflect the secondary ultrasonic wave 114, 114b in a different direction or the discontinuity may reflect at least a portion of the secondary ultrasonic wave 114, 114b in a direction toward the first surface 112, 112b. In another example, the discontinuity may create a dampening, scattering, or resistance to the secondary ultrasonic wave 114, 114b causing the secondary ultrasonic wave 114, 114b to reduce in amplitude or speed. In some embodiments, the discontinuity may reduce a dampening, scattering, resistance relative to other portions of the object 106, 106b enabling the secondary ultrasonic wave 114, 114b to retain amplitude or travel at a higher rate of speed than the secondary ultrasonic waves 114, 114b in other portions of the object 106, 106b.

When the secondary ultrasonic waves 114, 114b reach the second surface 116, 116b of the object 106, 106b, at least a portion of the secondary ultrasonic waves 114, 114b may reflect back toward the first surface 112, 112b. The secondary ultrasonic waves 114, 114b may then travel back through the object 106, 106b again encountering the same discontinuities. The reflected secondary ultrasonic waves 114, 114b may then exit the object through the first surface 112, 112b as an airborne ultrasonic signal 126, 126b. Alternatively, the secondary ultrasonic waves 114, 114b may travel parallel to the first surface 112, 112b and encounter discontinuities. The reflected secondary ultrasonic waves 114, 114b may then exit the object from the first surface 112, 112b as an airborne ultrasonic signal 126, 126b. The airborne ultrasonic signal 126, 126b may be captured by the receiver 120, 120b in act 910. The receiver 120, 120b may utilize a microphone 122, 122c (e.g., an optical microphone) to convert the airborne ultrasonic signal 126, 126b into an electric signal 128, 128b. Anomalies in the airborne ultrasonic signal 126, 126b may be detected and noted as discontinuities in the object 106, 106b. In some embodiments, the type of anomaly in the airborne ultrasonic signal 126, 126b may be analyzed to indicate one or more of a size of the discontinuity, a depth of the discontinuity, a type of discontinuity, etc.

The position of the receiver 120, 120b may be recorded along with the presence of a discontinuity in act 912. In embodiments where the receiver 120, 120b includes more than one optical microphone 122, 122c arranged in an array, individual microphones 122, 122c may record an anomaly where other microphones 122, 122c in the array do not. The array position of the microphone 122, 122c that detects the anomaly may be recorded along with the position of the receiver 120, 120b to provide accurate positioning data. In some embodiments, a single discontinuity may affect the signal received by multiple microphones 122, 122c in an array at varying degrees. Capturing the data from an array may enable the ultrasonic inspection system 100, 100b to pin point a discontinuity and eliminate echoes and/or shadows from consideration. In another example, the effect of the discontinuity felt by adjacent microphones 122, 122c may indicate a characteristic of the discontinuity that may be recorded by the processing device 130, 130b or the receiver 120, 120b.

After the information is recorded, the ultrasonic inspection system 100, 100b may move to a new location on the object 106, 106b to continue the inspection in act 914. In some embodiments, new location may be an adjacent location and, in some embodiments, the new location may be far removed. Once the ultrasonic inspection system 100, 100b has arrived in the new location, the process may then be repeated until the scan ends in act 916.

Embodiments of the present disclosure may enable ultrasonic testing without a liquid coupling medium such as water, oil, etc. Inspection of objects having complex geometries and/or rough surfaces can be difficult or even impossible where a liquid coupling medium is required. The elimination of a liquid coupling medium may enable ultrasonic testing of parts having complex geometries and/or rough surfaces. Many aerospace parts, automotive parts, and other components or objects include one or more complex geometries and rough surfaces. Embodiments of the present disclosure may provide manufacturers and end users a method of performing non-destructive ultrasonic inspections on parts with complex geometries or rough surfaces.

Embodiments of the present disclosure may also reduce the amount of constrictions on positioning of the emitter and/or receiver of the testing system. For example, embodiments such as those disclosed above may enable the emitter to direct signals to or the receiver to receive signals from the object to be inspected that are not required to be substantially or entirely normal to the surface of the object. Rather, the signal may be directed generally toward the object at oblique angles to the surface while still producing signal adequate for the inspection of the object.

Embodiments of the present disclosure may also enable a reduction in the size of ultrasonic testing equipment. Reducing the size of ultrasonic testing equipment may reduce the cost to an end user. For example, the cost to manufacture the ultrasonic testing equipment may be reduced and the floor space required for housing the ultrasonic testing equipment may also be reduced. Additionally, reducing the size of the testing equipment may allow for more portability. For example, portable testing equipment may be used to inspect large equipment, such as airplanes, ships, etc., on site allowing end users to more easily inspect their equipment periodically.

Non-destructive ultrasonic inspections may enable manufacturers to correct defects in parts or remove defective parts before providing the parts to a customer or client. End users may be able to more thoroughly inspect equipment for flaws, defects, or damage enabling the user to correct, repair, or replace parts before catastrophic failure occurs. This may allow for improvements in safety and reductions in downtime for equipment.

While certain illustrative embodiments have been described in connection with the figures, those of ordinary skill in the art will recognize and appreciate that the scope of this disclosure is not limited to those embodiments explicitly shown and described in this disclosure. Rather, many additions, deletions, and modifications to the embodiments described in this disclosure may be made to produce embodiments within the scope of this disclosure, such as those specifically claimed, including legal equivalents. In addition, features from one disclosed embodiment may be combined with features of another disclosed embodiment while still being within the scope of this disclosure, as contemplated by the inventor.

What is claimed is:

1. An inspection device, comprising:
   a laser emitter configured to produce a laser signal configured to generate and direct an ultrasonic signal into a structure, the laser emitter comprising a beam adjustment feature configured to alter the laser signal produced by the laser emitter; and
   a receiver comprising an array of optical microphones configured to receive the ultrasonic signal generated by the altered laser signal after at least a portion of the ultrasonic signal has passed at least partially through the structure, and wherein each optical microphone of the array of optical microphones comprises at least two mirrors configured to reflect one or more light beams and detect the ultrasonic signal through interference with the one or more light beams.

2. The inspection device of claim 1, wherein the altered laser signal has an expanded cross-sectional area that is greater than a cross-sectional area of the laser signal before the laser signal is altered by the beam adjustment feature.

3. The inspection device of claim 2, wherein the altered laser signal exhibits a substantially linear or polygonal shape as the laser signal is directed onto the structure.

4. The inspection device of claim 3, wherein the linear or polygonal shape is substantially a line on a surface of the structure.

5. The inspection device of claim 2, wherein the beam adjustment feature comprises at least one of an aperture, a beam splitter, a lens, a plate, gratings, attenuators, filters, apertures, diaphragms, slits, optical cavities, electro optic modulators, acousto-optic modulators, or a mirror.

6. The inspection device of claim 1, wherein the laser emitter comprises a pulsed laser.

7. The inspection device of claim 1, wherein each optical microphone of the array of optical microphones further comprises at least one light source, wherein the at least two mirrors are configured to receive waves generated by the laser signal and the at least one light source is configured to detect an optical signal near the at least two mirrors in response to the waves corresponding to the ultrasonic signal.

8. The inspection device of claim 1, wherein the ultrasonic signal travels through the structure, and wherein at least one optical microphone of the array of optical microphones is configured to detect the ultrasonic signal as the ultrasonic signal exits the structure.

9. The inspection device of claim 1, wherein the inspection device is oriented and configured for a through-transmission inspection of the structure where the laser emitter is positioned on one side of the structure and the receiver is positioned on another opposing side of the structure.

10. The inspection device of claim 1, wherein the inspection device is oriented and configured for a one-sided inspection of the structure where the laser emitter and the receiver are positioned on one common side of the structure.

11. The inspection device of claim 1, wherein the laser signal generated by the laser emitter and the ultrasonic signal received by the array of optical microphones is configured to travel through a gas without use of a coupling liquid.

12. The inspection device of claim 1, wherein the laser signal generated by the laser emitter and the ultrasonic signal received by the array of optical microphones is configured to travel through atmospheric air as the laser signal travels to the structure from the laser emitter and as the ultrasonic signal travels to the array of optical microphones from the structure.

13. An inspection device, comprising:
a laser emitter configured to generate and direct a laser beam onto a structure to generate an ultrasonic signal in the structure;
a beam adjustment feature configured to alter the laser beam generated by the laser emitter into an expanded laser beam having at least one dimension that is greater than a corresponding dimension of the laser beam before the laser beam is altered by the beam adjustment feature; and
a receiver comprising at least one optical microphone, the receiver configured to receive the ultrasonic signal generated by the laser beam after at least a portion of the ultrasonic signal has passed at least partially through the structure,
wherein the at least one optical microphone comprises at least two mirrors configured to reflect one or more light beams and detect the ultrasonic signal being a consequence of the expanded laser beam, through interference.

14. The inspection device of claim 13, wherein the at least one optical microphone comprises only static components.

15. The inspection device of claim 13, wherein the beam adjustment feature is configured to alter a shape of the laser beam.

16. A method for identifying a presence of one or more discontinuities in an object with an inspection device, the method comprising:
moving a laser emitter of the inspection device along a surface of the object;
expanding a beam emitted by the laser emitter;
generating ultrasonic signals traveling through the object with the beam emitted by the laser emitter;
detecting the ultrasonic signals with a receiver of the inspection device comprising an array of optical microphones, wherein each optical microphone of the array of optical microphones comprises at least two mirrors and detecting the ultrasonic signals comprises:
reflecting one or more light beams between the at least two mirrors of each optical microphone; and
detecting interference with the one or more light beams; and
determining the presence of the one or more discontinuities in the object from the detected ultrasonic signals.

17. The method of claim 16, further comprising sending the beam to the object with the laser emitter and receiving the ultrasonic signals from the object with the receiver without use of a liquid coupling medium between the inspection device and the object.

18. The method of claim 16, further comprising determining the presence of the one or more discontinuities by detecting anomalies in the ultrasonic signals.

19. The method of claim 18, further comprising evaluating the anomalies in the ultrasonic signals to determine one or more of a shape, size, and type of the discontinuities.

* * * * *